US009015342B2

United States Patent
Ni et al.

(10) Patent No.: US 9,015,342 B2
(45) Date of Patent: *Apr. 21, 2015

(54) TWO-LEVEL STRUCTURED OVERLAY DESIGN FOR CLUSTER MANAGEMENT IN A PEER-TO-PEER NETWORK

(75) Inventors: Jian Ni, New Haven, CT (US); Jie Lin, Rochester, NY (US); Steven J. Harrington, Webster, NY (US); Naveen Sharma, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/017,534

(22) Filed: Jan. 22, 2008

(65) Prior Publication Data

US 2008/0183891 A1 Jul. 31, 2008

Related U.S. Application Data

(60) Provisional application No. 60/885,951, filed on Jan. 22, 2007, provisional application No. 60/908,569, filed on Mar. 28, 2007.

(51) Int. Cl.
*G06F 15/173* (2006.01)
*H04L 12/46* (2006.01)
(Continued)

(52) U.S. Cl.
CPC ............ *H04L 12/4625* (2013.01); *H04L 45/64* (2013.01); *H04L 67/104* (2013.01); *H04L 67/1065* (2013.01); *H04L 67/1053* (2013.01); *H04L 67/1059* (2013.01)

(58) Field of Classification Search
CPC ... H04L 12/4625; H04L 45/64; H04L 67/104; H04L 67/1053; H04L 67/1059; H04L 67/1065
USPC ................................................. 709/239, 223
See application file for complete search history.

(56) References Cited

U.S. PATENT DOCUMENTS 4,542,458 A * 9/1985 Kitajima et al. ............... 718/104
5,559,984 A * 9/1996 Nakano et al. ................. 711/121
(Continued)

OTHER PUBLICATIONS

Chawathe, Y., Ratnasamy, S., Breslau, L., Lanham, N.,and Shenker, S. 2003. Making Gnutella-like p2p systems scalable. In Proceedings of the 2003 Conference on Applications, Technologies, Architectures, and Protocols for Computer Communications. Karlsruhe, Germany, (2003) pp. 407-418.*

(Continued)

*Primary Examiner* — David Lazaro
*Assistant Examiner* — Robert Shaw
(74) *Attorney, Agent, or Firm* — Michael J. Nickerson; Basch & Nickerson LLP

(57) ABSTRACT

A method and system for designing file replication schemes in file sharing systems consider node storage constraints and node up/down statistics, file storage costs, and file transfer costs among the nodes, user request rates for the files, and user specified file availability requirements. Based on these considerations, a systematic method for designing file replication schemes can be implemented. The method first determines the number of copies of the files to be stored in the system to achieve the desired goal (e.g., to satisfy file availability requirements, or to maximize the system hit rate), and then selects the nodes at which to store the file copies to minimize the total expected cost. The file replication scheme for a peer-to-peer file sharing system in a distributed and adaptive manner can scale to a large number of nodes and files and can handle changes in the user request pattern over time.

6 Claims, 5 Drawing Sheets

(51) Int. Cl.
*H04L 12/715* (2013.01)
*H04L 29/08* (2006.01)

(56) References Cited

U.S. PATENT DOCUMENTS

| | | | |
|---|---|---|---|
| 5,933,849 A | 8/1999 | Srbljic et al. | |
| 6,069,894 A * | 5/2000 | Holender et al. | 370/397 |
| 6,182,138 B1 * | 1/2001 | Aoki | 709/226 |
| 6,185,655 B1 * | 2/2001 | Peping | 711/6 |
| 6,253,217 B1 | 6/2001 | Dourish et al. | |
| 6,256,675 B1 * | 7/2001 | Rabinovich | 709/241 |
| 6,269,394 B1 * | 7/2001 | Kenner et al. | 709/217 |
| 6,321,317 B1 * | 11/2001 | Borowsky et al. | 711/170 |
| 6,401,121 B1 * | 6/2002 | Yoshida et al. | 709/227 |
| 6,421,687 B1 * | 7/2002 | Klostermann | 1/1 |
| 6,460,036 B1 * | 10/2002 | Herz | 707/748 |
| 6,516,350 B1 * | 2/2003 | Lumelsky et al. | 709/226 |
| 6,647,393 B1 * | 11/2003 | Dietterich et al. | 379/218.01 |
| 6,760,310 B1 * | 7/2004 | Sofman | 370/238 |
| 6,850,965 B2 * | 2/2005 | Allen | 709/203 |
| 6,970,434 B1 * | 11/2005 | Mahany et al. | 370/256 |
| 6,983,463 B1 * | 1/2006 | Hunt | 719/316 |
| 7,010,538 B1 * | 3/2006 | Black | 707/636 |
| 7,266,132 B1 * | 9/2007 | Liu et al. | 370/538 |
| 7,330,997 B1 * | 2/2008 | Odom | 714/6 |
| 7,603,530 B1 * | 10/2009 | Liikanen et al. | 711/162 |
| 7,627,617 B2 * | 12/2009 | Kavuri et al. | 1/1 |
| 7,739,233 B1 * | 6/2010 | Ghemawat et al. | 707/610 |
| 2002/0199060 A1 * | 12/2002 | Peters et al. | 711/114 |
| 2003/0093501 A1 * | 5/2003 | Carlson et al. | 709/220 |
| 2003/0158920 A1 * | 8/2003 | Lynch et al. | 709/220 |
| 2003/0172089 A1 * | 9/2003 | Douceur et al. | 707/200 |
| 2004/0054807 A1 | 3/2004 | Harvey et al. | |
| 2004/0111390 A1 * | 6/2004 | Saito et al. | 707/1 |
| 2004/0249970 A1 | 12/2004 | Castro et al. | |
| 2005/0091399 A1 | 4/2005 | Candan et al. | |
| 2005/0097285 A1 * | 5/2005 | Karamanolis et al. | 711/159 |
| 2005/0097286 A1 * | 5/2005 | Karlsson et al. | 711/159 |
| 2005/0169179 A1 | 8/2005 | Antal et al. | |
| 2006/0200400 A1 * | 9/2006 | Hunter et al. | 705/36 R |
| 2006/0230072 A1 | 10/2006 | Partovi et al. | |
| 2007/0159983 A1 | 7/2007 | Eglin et al. | |
| 2007/0234102 A1 * | 10/2007 | Fan et al. | 714/4 |
| 2008/0177767 A1 | 7/2008 | Lin et al. | |
| 2008/0177873 A1 | 7/2008 | Ni et al. | |

OTHER PUBLICATIONS

Chen, Y.,Katz, R., and Kubiatowicz, J., Scan: A dynamic, scalable and efficient content distribution network. In Proceedings of International Conference on Pervasive Computing (2000).*
Stritter, E.P. File migration. Computer Science Rep. STAN-CS-77-594, Dept. Computer Science, Stanford Univ., Stanford, Calif., Jan. 1977.*
Smith, A.J., "Long-term file migration. development and evaluation of algorithms," Commun. ACM 24,8 (Aug. 1981), pp. 521-532.*
Ames, J . E., and Foster, D.V. "Dynamic fie assignment in a star network," in Proc. Computer Networks Symp. (Gaithersburg, Maryland, Dec. 1977) pp. 36-40.*
Lawrence W. Dowdy , Derrell V. Foster, Comparative Models of the File Assignment Problem, ACM Computing Surveys, v.14 n. 2, p. 287-313, Jun. 1982.*
Qiu et al. On the Placement of Web Server Replicas, IEEE, INFOCOM 2001, vol. 3, pp. 1587-1596 (2001).*
Snyder & Daskin Reliability Models for Facility Location: The Expected Failure Case, Transportation Science, vol. 39 No. 3, (2005) pp. 400-416.*
Kangasharju et al., Adaptive Content Management in Structured P2P Communities, ACM International Conference Proceeding Series; vol. 152 Proceedings of the 1st international conference on Scalable information systems (2006) http://portal.acm.org/citation.cfm?id=1146871.*
Jamin et al.—Constrained Mirror Placement on the Internet, IEEE Journal on Selected Areas in Communications, vol. 20, No. 7, Sep. 2002.*
K. M. Chandy and J. E. Hewes, File Allocation i n Distributed Systems, Proceedings of the 1976 ACM SIGMETRICS conference on Computer performance modeling measurement and evaluation, 1976, p. 10-13.*
R.G. Casey, Allocation of copies of a file in an information network, ACM, Proceedings of Spring Joint Computer Conference AFIPS (1972), pp. 617-625.*
Feng Mao; Hai Jin; Deqin Zou; Baoli Chen; Li Qi; , "QoS oriented dynamic replica cost model for P2P computing," Distributed 25th IEEE International Conference on Computing Systems Workshops, Jun. 6-10, 2005 pp. 822-828.*
Karlsson & Karamanolis—Bounds on the Replication Cost for QoS—HP Technical Report (2003) http://www.hpl.hp.com/techreports/2003/HPL-2003-156. html.*
Su et al. Optimal Replication Algorithm for Scalable Streaming Media in Content Delivery Networks, IEICE Trans. Inf. & Syst. vol. E87-D, No. 12, Dec. 2004 pp. 2723-2732 http://www.katto.comm.waseda.ac.jp/~katto/conferences/ieice/transaction/2004-1.pdf.*
Chu, Optimal File Allocation in a Multiple Computer System, IEEE Transactions on Computers, vol. C-18, No. 10, (Oct. 1969), pp. 885-889.*
Chen, Optimal File Allocation in multi-level storage systems, ACM, National Computer Conference (1973), pp. 277-282.*
On et al. "QoS-Controlled Dynamic Replication in Peer-to-Peer Systems", Proceedings of Third International Conference on Peer-to-Peer Computing, 2003.*
J. Kangasharju, K.W. Ross, and D.A. Turner. Optimal Content Replication in P2P Communities (2002) http://citeseerx.ist.psu.edu/viewdoc/download?doi=10.1.1.19.5762&rep=rep1&type=pdf.*
Kangasharju et al ., Optimizing File Availability in Peer-to-Peer Content Distribution (2002) http://cis.poly.edu/~ross/papers/fileavailability.pdf.*
Mahmoud & Riordon, Optimal allocation of resources in distributed information networks, ACM Transactions on Database Systems (TODS), vol. 1 , Issue 1 (Mar. 1976), pp. 66-78 http://portal.acm.org/citation.cfm?id=320449.*
Karlsson & Karamanolis—Bounds on the Replication Cost for QoS—HP Technical Report (2003) http://www.hpl.hp.com/techreports/2003/HPL-2003-156.html.*
Cohen & Shenker, Replication Strategies in Unstructured Peer-to-Peer Networks, SIGCOMM'02, Aug. 1923, 2002 pp. 177-190 http://portal.acm.org/citation.cfm?id=633043.*
On et al. Quality of Availability: "Replica Placement for Widely Distributed Systems", IWQoS 2003, LNCS 2707, Springer (2003) pp. 325-342.*
On et al. "QoS-Controlled Dynamic Replication in Peer-to-Peer Systems", Proceedings of $3^{rd}$ International Conference on Peer-to-Peer Computing, 2003.*
Chu Optimal File Allocation in a Multiple Computer System, IEEE Transactions on Computers (Jun. 1969), pp. 885-889.*
Wu et al Redundancy Schemes for High Availability in DHTs, ISPA 2005, LNCS 3758, (2005).*
Karlsson et al, A Framework for Evaluating Replica Placement Algorithms, HPL-2002-219, HP Labs, Aug. 2002.*
Mahmoud & Riordon, Optimal allocation of resources in distributed information networks, ACM Transactions on Database Systems (TODS), vol. 1, Iss.1 (Mar. 1976), pp. 66-78.*
Tewari & Adam, Distributed File Allocation with Consistency Constraints, IEEE, Proceedings of the International Conference on Distributed Computing (1992), pp. 408-415.*
Ranganathan et al. Improving Data Availability through Dynamic Model-Driven Replication in Large Peer-to-Peer Communities, Proceedings of the 2nd IEEE/ACM International Symposium on Cluster Computing and the Grid (CCGRID.02), 2002.*
Kangasharju et al, Optimizing File Availability in Peer-to-Peer Content Distribution (2002) http://cis.poly.edu/~ross/papers/fileavailability.pdf.*
Kangasharju, Ross & Turner. Optimal Content Replication in P2P Communities (2002) http://citeseerx.ist.psu.edu/viewdoc/download?doi=10.1.1.19.5762&rep=rep1&type=pdf.*

(56) References Cited

OTHER PUBLICATIONS

Loukopoulos and Ahmad, "Static and adaptive distributed data replication using genetic algorithms" in Journal of Parallel Distributed Computing 64 (2004) pp. 1270-1285.*

S. Androutsellis-Theotokis and D. Spinellis, A Survey of Peer-to-Peer Content Distribution Technologies ACM Computing Surveys, vol. 36, No. 4, (Dec. 2004).*

LoPresti et al, Dynamic Replica Placement in Content Delivery Networks, MASCOTS'05, IEEE (2005).*

Szymaniak et al, Latency Driven Replica Placement (SAINT 2005) http://www.globule.org/publi/LDRP_saint2005-2.pdf.*

Qiu et al, "On the placement o f web server replicas," INFOCOM 2001, (Anchorage, AK), IEEE Apr. 2001, pp. 1587-1596.*

Mao et al , QoS Oriented Dynamic Replica Cost Model for P2P Computing, IEEE Distributed Computing Systems Workshops, Jun. 2005, pp. 822-828.*

Hurley et al, "File Migration and File Replication: A Symbiotic Relationship", IEEE Transactions on Parallel and Distributed Systems, vol. 7, No. 6, Jun. 1996.*

Tenzakhti et al, Replication algorithms for the World-Wide Web, Journal of Systems Architecture 50 (2004) pp. 591-605.*

Litwin, W.; Neimat,M.; Schneider, D.; HH*—A Scalable, Distributed Data Structure; Hewlett-Packard Labs, Palo Alto; c. 1996 ACM; ACM Transactions on Database Systems, vol. 21, No. 4, Dec. 1996, pp. 480-525.

An unofficial prosecution history as of Jun. 12, 2010 for U.S. Appl. No. 12/017,530.

An unofficial prosecution history as Jun. 24, 2010 for U.S. Appl. No. 12/017,545.

An unofficial prosecution history of U.S. Appl. No. 12/017,545 between Jul. 22, 2010 and Aug. 25, 2010.

Ripeanu, A.; Foster, I.; A Decentralized, adaptive replica location mechanism; Proceedings of 11th IEEE International Symposium on High Performance Distributed Computing (HPDC-11), Jul. 24-26, 2002; 9 pages.

An unofficial prosecution history between Jul. 22, 2010 and Dec. 15, 2010 for U.S. Appl. No. 12/017,530.

An unofficial prosecution history between Jul. 22, 2010 and Dec. 15, 2010 for U.S. Appl. No. 12/017,545.

An unofficial prosecution history between Dec. 15, 2010 and Mar. 22, 2011 of U.S. Appl. No. 12/017,530, filed Jan. 22, 2008, published Jul. 24, 2008, as US-2008-0177767-A1; inventor: Jie Lin et al.

Kangasharju, J.; Ross, K.; Turner, D.; Adaptive Content Management in Structured P2P Communities; In First International Conference on Scalable Information Systems (Infoscale), Hong Kong, May 2006.

Shmoys, D.; Tardos, E.; Ardal, K.; Approximation algorithms for facility location problems; Proceedings of the 29th Annual ACM Symposium on Theory of computing, ACM Press, pp. 265-274.

Ganesan, P.; Gummadi, K.; Gracia-Molina, H.; Canon in G major: Designing DHTs with Hierarchial Structure; Proceedings of the 24th International Conference on Distributed Computing Systems (ICDCS'04) pp. 263-272 Pub 2004 IEEE Computer Society.

Stoica, I. ; Morris, R.; Karger, D.; Kaashoek, M.; Balakrishnan, H.; Chord: A Scalable Peer-to-peer Look-up Service for Internet Applications; Proceedings of the 2001 ACM SIGCOMM Conference.

Dowdy, L.; Foster, D.; Comparative Models of the File Assignment Problem; ACM Computing Surveys (CSUR) vol. 14 , Issue 2 (Jun. 1982) pp. 287-313 Pub1982.

Schmidt, C.; Flexible Information Discovery with Guarantees in Decentralized Distribution Systems; High Performance Distributed Computing Proceedings of the 12th IEEE International Symposium on High Performance Distributed Computing.

Garces-Erice, L.; Biersack, E.; Ross, K.; Felber, A.; Urvoy-Keller, G.; Hierarchical Peer-to-Peer Systems; In Parallel Processing Letters, vol. 13, Issue 4, pp. 643-657, Dec. 2003.

Lua, E.; Crowcroft, J.; Pis M.; Sharma, R.; Lin, S.; A Survey and Comparison of Peer-to-Peer Overlay Network Schemes; IEEE Communications Survey and Tutorial, Mar. 2004.

\* cited by examiner

TWO-LEVEL STRUCTURED OVERLAY DESIGN FOR CLUSTER MANAGEMENT IN A PEER-TO-PEER NETWORK

PRIORITY INFORMATION

This application claims priority from U.S. Provisional Patent Application Ser. No. 60/885,951, filed on Jan. 22, 2007. The entire content of U.S. Provisional Patent Application Ser. No. 60/885,951, filed on Jan. 22, 2007, is hereby incorporated by reference.

This application also claims priority from U.S. Provisional Patent Application Ser. No. 60/908,569, filed on Mar. 28, 2007. The entire content of U.S. Provisional Patent Application Ser. No. 60/908,569, filed on Mar. 28, 2007, is hereby incorporated by reference.

BACKGROUND

A network overlay is an abstraction of a physical network that identifies a subset of network nodes and maintains a set of logical links between them. The software that implements a network overlay must maintain node membership and communication, mapping the logical links to actual physical connections. In peer-to-peer overlays, all nodes participate in overlay management, maintaining a number of the logical links between them; structured peer-to-peer overlays in particular have clearly defined and enforced link topologies and are often used to support distributed data structures, such as distributed hash tables. A number of structured overlay designs exist, of which the most cited include CHORD, CAN, Pastry, and Tapestry.

Following the concept of peer-to-peer, the overlays above have flat designs that do not distinguish differences between nodes or links. In the case of nodes, this is the ideal from the point of view of a peer-to-peer design, and is advantageous because distinguished or specialized nodes are potential bottlenecks or singular points of failure.

However, since the realization of logical links depends on the underlying physical connections between nodes, ignoring differences between links can lead to poor performance. For example, two nodes that are neighbors (share a link) in the overlay may in fact be separated by a large geographical distance and/or network hops.

Introducing a hierarchy into an overlay design is a way to incorporate the differences between links. For example, nodes that are close according to some locality metric can be grouped or clustered at a low level so that interactions between local nodes do not leave the cluster. Clusters can then be linked at higher levels so that nodes in different clusters can interact. It can be proven that a two-level overlay has better average search times than a flat overlay, as follows.

Let the average communication latency between two nodes in the same cluster be t, and that between two nodes in different clusters be T, such that t<<T. Let f(x) be the average number of overlay hops to resolve a query in an overlay with x nodes. Assuming n nodes per cluster and k clusters (N=nk total nodes) and that all clusters are connected, the average search times in a one level and two level overlay are obtained as follows, given that the query can be resolved in only one cluster.

The probability that a hop is to a node on the same cluster is $(n-1)/(nk-1) \approx 1/k$, given that there are n nodes per cluster. Based on this probability, the average hop latency (h) is the sum of the time for each kind of hop, weighted by the probability of that hop, namely, $h=(1/k)t+(1-1/k)T$.

Thus, the average search latency for the overlay is given by the product of the average hop latency and the average number of hops per search, which in this case is in the full overlay of N nodes, $$h \cdot f(N) = \frac{t \cdot f(N)}{k} + \frac{(k-1) \cdot T \cdot f(N)}{k}.$$

A sequential search is where each cluster is queried until the required data is found. In this case, the probability that a query is resolved in the $j^{th}$ cluster is needed. Since for this analysis any cluster is equally likely to contain the result, this probability is 1/k. Now, the search latency if query resolved in $j^{th}$ cluster ($l_j$) is given by $j \cdot t \cdot f(n)+(j-1)T$.

The above was obtained from j searches within local clusters and the long distance jumps between them. Finally, the probability of each latency is used to obtain the average search latency $$(1/k) \cdot \sum_j l_j = \frac{t(k+1) \cdot f(n)}{2} + \frac{T(k-1)}{2}.$$

If the number of clusters k is constant, the search latency given by $$h \cdot f(N) = \frac{t \cdot f(N)}{k} + \frac{(k-1) \cdot T \cdot f(N)}{k}$$

is dominated by the product of the large time T and the average search time for the total number of nodes N, whereas for $$(1/k) \cdot \sum_j l_j = \frac{t(k+1) \cdot f(n)}{2} + \frac{T(k-1)}{2}$$

the term for T is linear and the search latency is dominated by the search time within clusters given by $t \cdot f(n)$.

The designs of most structured peer-to-peer overlays are flat and do not reflect the underlying physical or logical organization or grouping of nodes. Ignoring this underlying infrastructure leads to inefficient or unwanted performance because there is no control over the communication of nodes between different groups, which is considered to be more expensive than intra-group communication.

Hierarchical overlay designs incorporate this knowledge into the overlay by clustering nodes based on some locality metric and interconnecting clusters at a higher level. These hierarchical overlays have been constructed using specialized nodes from the lower level clusters, which connect to form the higher level overlay. Designs exist for hierarchical overlays that connect clusters without cluster heads, but theses designs still use converging inter-cluster paths that are potential bottlenecks and do not fully exploit locality for inter-cluster searches.

The above analysis does not consider how clusters are interconnected. Most existing designs for hierarchical overlays use the concept of cluster-head, so that one node or subset of nodes in each cluster are used to form the higher level overlay(s) that connect the lower level clusters. Cluster-heads are not necessarily unique or static. Different techniques, such as voting, rotation, replication, etc., can be used to minimize the potential of the cluster-head as a bottleneck or single point of failure.

For example, links between nodes in different clusters can be constructed as if constructing a single layer cluster, but keeping intra-cluster and inter-cluster links separate and limiting the number of inter-cluster links to bound the average number of links per node. In this example, the inter-cluster paths still converge so that inter-cluster paths are potential bottlenecks.

It desirable to provide a two-level case that has less storage overhead while allowing all nodes access to remote clusters, and better exploits locality for search optimization.

BRIEF DESCRIPTION OF THE DRAWINGS

The drawings are only for purposes of illustrating various embodiments and are not to be construed as limiting, wherein.

DETAILED DESCRIPTION

Figure 1:
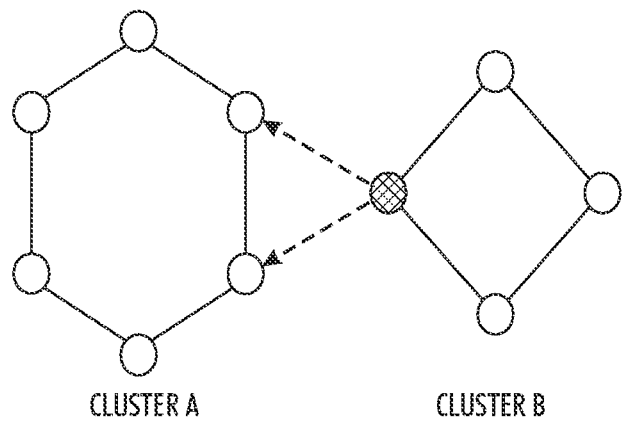
FIG. 1 illustrates a shaded node from cluster B performing a virtual join into cluster A.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

The description of the following example will be explained in terms of the CHORD overlay. However, any structured overlay topology lends itself to this construction. A CHORD overlay has a ring-based topology, where every node is randomly assigned an identifier in the range $[0, 2^m)$. Nodes are organized in order according to their identifier to form the ring.

In a classical, single-level CHORD ring, a node joins by contacting any other node already in the overlay, from which it obtains references to its successor and predecessor in the ring, as well as a number of extra references (chords or fingers) to allow for faster traversal of the ring. References are kept in a data structure called a finger table. Successor and predecessor references are enough for successful routing in CHORD.

In this embodiment, a two-level overlay design, local clusters are organized into independent CHORD rings. For each cluster, nodes' finger tables contain only local nodes. If a single identifier space is used for all nodes (that is, all nodes obtain their identifier in the same range), any node in one cluster could also join any other of the existing clusters.

However, instead of performing a regular join operation, a node can simply query the remote cluster for its successor and predecessor in that cluster. These inter-cluster operations are defined as virtual joins, and the virtual joins differ from a normal CHORD join operation in two ways: (1) the structure of the cluster that handles the virtual join operation of an external node is not modified, and (2) the joining node only records references to two (successor and predecessor) nodes in the remote cluster, and stores the two (successor and predecessor) nodes separately from its own local finger table.

FIG. 1 illustrates a virtual join operation between two clusters. In FIG. 1, the shaded node from cluster B performs a virtual join into cluster A. Moreover, on FIG. 1, only successor-predecessor relationships are shown. When all external nodes have joined a particular cluster, the new topology can be viewed as a virtual ring with different types of connections, as FIG. 2 illustrates.

Figure 2:
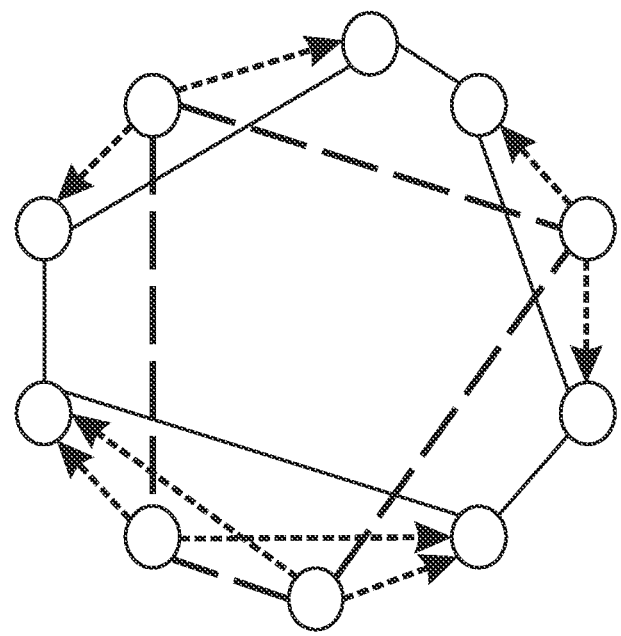
FIG. 2 illustrates a "virtual ring" from the point of view of cluster A.

As illustrated in FIG. 2, the "virtual ring" from the point of view of cluster A. In FIG. 1, cluster A references are illustrated as solid black lines, and cluster B references are illustrated as the dashed lines. The inter-cluster references from cluster B are illustrated as the dashed arrows.

When a new node joins the system, the node will normally obtain its identifier and join its local cluster (clustering is a system specific issue, and must be defined beforehand, either by a system administrator or by some automated mechanism). The node will then perform virtual joins with this same identifier in each of the other clusters that make up the system (alternatively, these virtual joins can be executed only when required). Like for normal CHORD joins, a virtual join only requires knowledge of one existing node in each ring.

Each node will then store its own finger table as well as its successors and predecessors in each of the remote clusters the node has virtually joined. This embodiment assumes that the number of clusters is small compared to the number of nodes within each cluster and is relatively stable or static. In this way, the additional space needed for the external references will also be constant.

The result of this design is a fully connected higher level overlay at relatively small cost, where any node can be used as a link between clusters. Thus, there are no specialized nodes or converging paths as potential bottlenecks or single points of failure. Since the successor-predecessor relationship is maintained for nodes between clusters, routing between clusters is expected to be better than the average case for the two-level overlay. This is because a query will already be closer to the destination node when it enters the remote cluster than if an arbitrary node were used. This will be explained in more detail below.

In CHORD, a query for a given identifier is routed to the closest node greater or equal to it. That is, a query for an identifier i is routed to the successor of i. If a query for i originates from a cluster that does not contain i, it will be routed to the successor of i in that cluster. This node is then responsible for forwarding the query (sequentially or in parallel, depending on the type of query) to other clusters.

Figure 3:
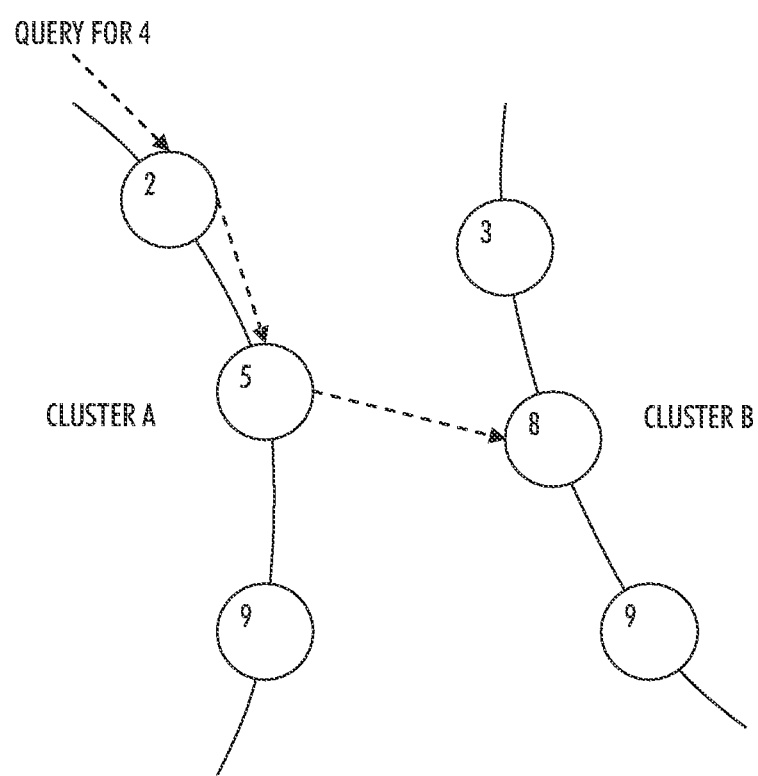
FIG. 3 illustrates how queries are propagated between clusters.

Since the node holds the link for its successor in the remote cluster, the node is expected that the remote node is the successor of i in this cluster, or is at least close to it in the identifier space, as FIG. 3 illustrates.

FIG. 3 illustrates how queries are propagated between clusters. As illustrated in FIG. 3, the query for id 4 is routed to its successor node 5 in cluster A. If the query is not found there, the query is routed to the successor for node 5 in cluster B, node 8, which in this case is also the successor of node 4, and could contain the result being sought.

It is difficult to prove that the average search time in this case is better than the average search time if the query is initiated at an arbitrary node in the remote overlay. However, simulation can be used to establish a difference between these two cases.

In CHORD, failures are recognized by periodically probing the entries of the finger table to find if the referenced nodes are still up, or if others have recently joined to take their place. CHORD has self-repair mechanisms that allow it to fix broken finger table entries by queries to successive neighbors. Due to the high cost of inter-cluster communication, periodically checking remote neighbors may not be reasonable.

Remote joins may affect the locality of queries and thus adversely affect their performance, but the queries can still be effectively realized in this case. If the remote successor of a node has left the overlay or failed, a node can alternatively use its remote predecessor or forward the query to any other local node that can relay the query to the remote cluster. Again, performance is affected because the advantage of locality is lost, but the query can still be resolved.

If, after completing a query, a node is aware that its remote references are outdated, it can perform a new virtual join in order to renew them. The bootstrap node from the remote cluster can either be one of its valid entries or that of any other local node.

In the above embodiment, a two-level overlay network design where objects placement can be determined by hashing table for efficient search was described. However, this description did not provide a framework to determine the number of resource replicas based on resource availability and optimal locations of these replicas or a framework to determine the number of resource replicas based on resource availability and optimal locations of these replicas using a cost model.

Moreover, this description did not consider how to index these replicas for efficient search, which depends on the type of overlay used. In addition, this description did not specify a particular approach to determine these hashed locations. Moreover, these hashed locations may not be optimal with respect to a cost model. In fact, optimality is not a concern when using distributed hashing table.

As pointed out above, it is desirable to provide a framework that makes the connection between the optimal placement of replicas of each networked resource and the distributed hash table used in overlay design so that the replicas can efficiently be searched.

More specifically, a distributed hash table can be used to pick some nodes as index nodes for each resource. These index nodes will save the locations of the nodes that actually store the replicas of each resource. The up and down probabilities of these index nodes will be considered so that the resource availability requirement is satisfied. It is noted that CHORD is used as the underlying hash table.

In a network of devices, resource replicas could be created and distributed in ways that satisfy the demands from each device. However, it is desirable to efficiently search for resource replicas placed strategically in the network. Towards this end, a method links each replica's optimal location to each original file's hashed location so that these replicas can be effectively searched. As a result, the up and down probabilities of those nodes servings as links need to be considered in order to satisfy the resource availability requirements.

Many current peer-to-peer networks such as CAN, CHORD, Pastry and Tapestry, are based on distributed hash tables, which provide a decentralized, many-to-one mapping between user objects and peers. This mapping is accomplished by organizing the peers in some virtual coordinate space and hashing each object to these virtual coordinates. The information about each object (such as the IP address of the owner) is kept by the peer to whose coordinates the object hashes. Their distributed structure, excellent scalability, short routing distances, and failure resilience make distributed hash tables highly suitable for peer-to-peer networks.

In CHORD, every file name or node name is hashed into a CHORD ID. Each node will be in charge of the range of CHORD IDs between its CHORD ID and its successor's CHORD ID. Nodes are formed into a ring. Therefore, one can determine which node should be in charge of a certain file based on that file's CHORD ID. For instance, suppose that node A has CHORD ID 1000 and its successor node B has CHORD ID 2000. Therefore, if a file has CHORD ID 1050, it will be stored in node A. Consequently, any inquiry for this file will go to node A.

For illustration purpose, in the remaining description will use CHORD as the underlying hash table and note that the approach is applicable using other distributed hash tables.

To efficiently search for resource replicas placed strategically in the network requires two steps. In the first step, each original file's hashed location in a cluster-based overlay is determined using hash tables. In the second part, each file replica's optimal location is linked to the hashed location of the original file.

For the first part, it is noted that in the two-level overlay design, nodes form clusters. Therefore, a distributed hash table can be constructed, in the example of a CHORD ring, within each cluster. Each cluster is given a name which can be hashed into a distributed hash table key, in this example a CHORD id. Essentially, another distributed hash table is created to organize clusters, only that there is no cluster head necessary. Therefore, each node will keep two ids, one for its own and one for the cluster to which it belongs.

As a result, to store any file in this overlay, the file's CHORD ID is first obtained through hashing. Based on this ID, the cluster on which the file should be stored can be determined. After choosing the cluster, the node within that cluster to which the file would be stored can be determined. It is noted that the distributed hash table used to link clusters can be different from the distributed hash table used to link nodes within each cluster. For illustration purpose, CHORD is used as the underlying distributed hash table for both.

For example, suppose that cluster A has CHORD ID 1000 and cluster B has CHORD ID 2000. Suppose that nodes x, y and z are in cluster A with CHORD IDs 10, 1010, 3000, respectively. Further suppose that nodes a, b and c are in cluster B with CHORD IDs 33, 2043, 3053, respectively. Now suppose that a file with CHORD ID 1060 needs to be stored in the system.

First, it can be determined that this file needs to be stored in cluster A because its CHORD ID is in the range controlled by cluster A. Next, it is determined that node y within cluster A should store this file because file ID 1060 is in the range controlled by node y. After this step, a node is responsible for each file which can be easily found through hashing. These nodes can be referred to as index nodes in the sequel.

In the second step, the replication scheme for each file is stored in the index nodes obtained in the first step. To do this, for each file, some number of index nodes is selected. How to determine this number later will be explained later.

Each of these index nodes will store locations of the nodes that actually store the file. For instance, if file k has three replicas k1, k2, and k3 stored on nodes n1, n2, and n3, respectively, an index node of file k will contain the locations (e.g. IP addresses) of nodes n1, n2, and n3. This way, if one inquiry comes to an index node, it can be directed to n1, n2, or n3 depending which node is up. However, if there is only one index node, this node will become the single point of failure, which defeats the whole purpose of having multiple replicas.

Therefore, multiple index nodes should be utilized, each of which contains the optimal locations of nodes that actually store the replicas.

Next, a procedure to determine the number of index nodes needed and how to locate these index nodes will be explained. To do this, realizing that the nodes chosen to be the index nodes for file k also have up and down probability, these probabilities are used to determine the number of index nodes. Without loss of generality, it is assumed, for the purposes of this explanation, that all nodes have equal up and down probability.

It is noted that the file availability approach chooses $n_k$ copies of file k to be stored in the system such that the availability of file k is greater than or equal to the required file availability specified by user, denoted by $AVA_k$. Therefore, the availability of file k can be written as $$1 - q^{n_k} \geq AVA_k \Rightarrow n_k \geq \left\lceil \frac{\ln(1 - AVA_k)}{\ln q} \right\rceil$$

where q=1−p with p being the node's up probability.

Since each index node contains locations of all nodes that store replicas for a file, it follows that if any index node is up, the availability of file k will be $(1-q^{n_k})$. However, an index node also has an up probability of p. It follows, from these probabilities that with $m_k$ being the number of index nodes for file k, that the availability of file k is given by $(1-q^{m_k})(1-q^{n_k})$.

Therefore, to satisfy the user required file availability $AVA_k$, the availability of file k is defined as $(1-q^{m_k})(1-q^{n_k}) \geq AVA_k$. Since $n_k$ has already been determined, that value can be substituted in the above equation to determine $m_k$.

After determining the number of index nodes, how to select these index nodes using distributed hash tables needs to be determined. Again, there are many ways to select these index nodes using distributed hash tables, the following discussion will focus on a single approach as an example.

Under CHORD structure, one simple way to choose the index nodes is the following. It is noted that each original file's hashed location in a cluster-based overlay using distributed hash tables has already been determined. The node responsible for this location is the first index node. Its 1-hop, 2-hop to $m_k$-hop successor in the CHORD ring then becomes the second, the third to the $m_k^{th}$ index node. For other distributed hash tables, there are also unique ways to determine $m_k$ neighbors/successors of any node.

It is noted that, in this example, the index nodes were chosen to be in the same cluster because communication overhead within a cluster is usually much less than that between clusters. Therefore, when an inquiry for file arrives at one index node but finds that node is down, the inquiry does not have to go out of that cluster. The inquiry will simply be routed to the next index node within the same cluster.

Figure 4:
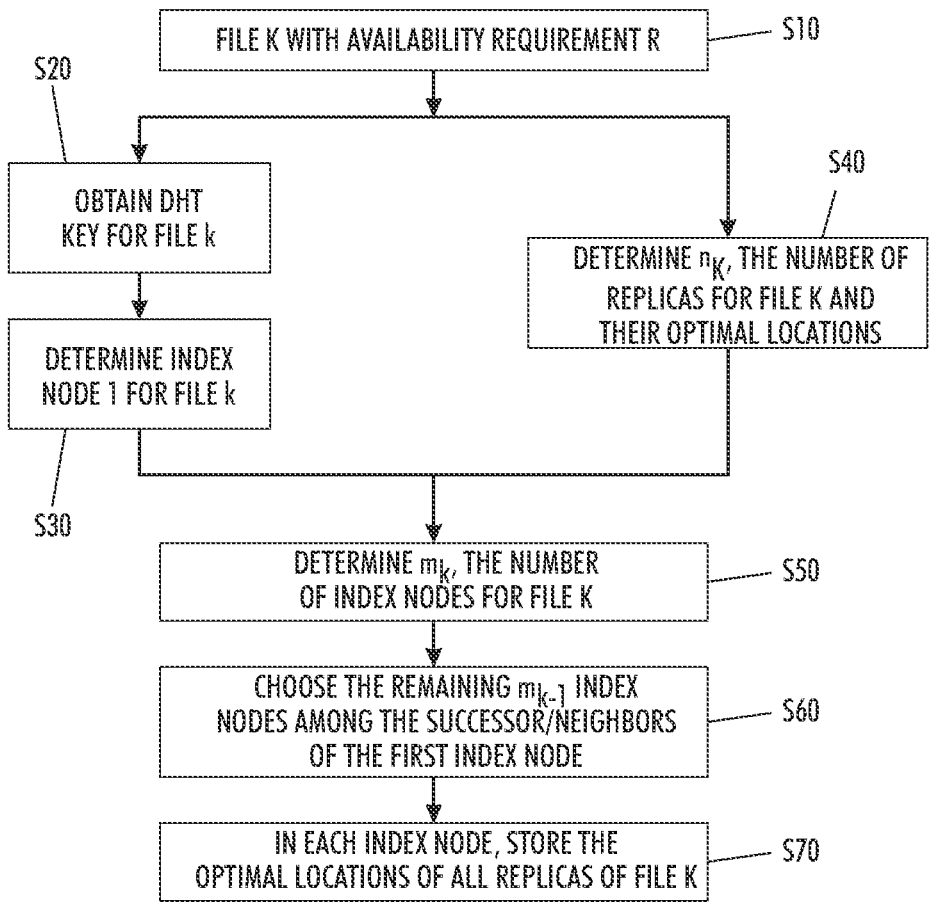
FIG. 4 illustrates a flowchart for determining the number of index nodes needed and how to locate these index nodes.

To summarize, the first index node for file k is determined through distributed hash tables. Next, the number of index nodes $m_k$ needed in order to satisfy the file availability requirements is determined. Then $m_k-1$ number of neighbors/successors of the first index node within the same cluster is selected to be the remaining index nodes. In addition, each index node will store optimal locations of all replicas for file k. FIG. 4 illustrates a flowchart of this process.

As illustrated in FIG. 4, step S10 identifies a file k with availability requirement R. Step S20 obtains a distributed hash table key for file k in parallel to step S40 determining $n_k$, the number of replicas for file k and their optimal locations. Step S30 determines Index node 1 for file k, and step S50 determines $m_k$, the number of index nodes for file k. Step S60 chooses the remaining $m_k-1$ index nodes among the successor/neighbors of the first index node. At step S70, in each index node, the optimal locations of all replicas of file k are stored.

The following will be a discussion of a comparison of average search latency. For this discussion, CHORD will be utilized as the underlying structure for the comparison between the average search latency under the above-described hashing scheme and that of a conventional one-level CHORD.

For illustration purpose, it is noted that each cluster has same number of nodes, denoted by n, and that there are K clusters. Therefore, the total number of nodes, denoted by N, is equal to nK. Further, it is noted, for this discussion, that the (average) communication latency between nodes in the same cluster is t, and the (average) communication latency between nodes in different clusters is T. It is also noted, for this discussion, that the communication cost between nodes in the same cluster is negligible compared with that between nodes in different clusters, i.e., t<<T.

It is noted, for this discussion, that a standard CHORD construction organizes all nodes into a CHORD ring. A file is associated with a CHORD ID and stored in a unique node responsible for that CHORD ID.

It is known that in CHORD, the number of neighbors per node is on the order of log N=log n+log K. The probability of two nodes in the above-described hashing scheme CHORD overlay are in the same cluster, denoted by $P_{sc}$, is $P_{sc}=(n-1)/(nK-1) \approx 1/K$.

It is noted that if two nodes are in the same cluster, the search latency between them will be t, otherwise the latency will be T. It follows from this and the equation for $P_{sc}$ that the average latency between two nodes in an one-level Chord is $(1/K)t+(1-1/K)T$. Since the average number of hops to locate a file is also known to be on the order of log N, it follows from this that the average search latency, denoted by $L_1$, is $L_1=\log N*[(1/K)t+(1-1/K)T]=[\log(n)+\log K][*(1/K)t+(1-1/K)T]=\log(n)[t/k+(k-1)T/k]+\log K[t/k+(k-1)T/k]$. Since t<<T, the equation reduces to $L_1=\log(n)[(k-1)T/k]+\log K[(k-1)T/k]$.

As discussed above, the distributed hash tables used to link clusters can be different from the distributed hash tables used to link nodes within each cluster.

For illustration purpose, CHORD has been used as the underlying distributed hash tables for both. In this illustration, each node has a two-field ID. The first field of the ID of a node indicates its cluster; the second field of the ID represents itself. Nodes within the same cluster form a local Chord using their second-field IDs. The clusters form a CHORD ring based on cluster IDs.

When storing a file, the file is initially hashed to the designated cluster; then within the designated cluster the file is hashed to the designated node (the hashed node for the file). Then the file is stored in this hashed node. Therefore, when an inquiry for a particular file arrives, it will first be forwarded between clusters to get to the right cluster. The average cluster hop is then given by log(K) since clusters are organized into a CHORD structure. Once the inquiry is directed to the right cluster, it will take another log(n) node hop on average to find the right node. As pointed out above, the communication latency between nodes in the same cluster is t, and the (average) communication latency between nodes in different clusters is T, it follows from these that the average search latency, denoted by $L_2$, is $L_2=\log(n)*t+\log K*T$. Since t<<T, $L_2<L_1$.

In summary, a system and method to efficiently locate resource replicas in a cluster-based hierarchical peer-to-peer system has been described. The locations of replicas for each resource have also been described. The index nodes locations are determined using distributed hash tables. The number of index nodes is determined based on resource availability requirement. Each index node saves the locations of all replicas of a resource. As a result, the replicas are placed with respect to resource request rate and user can search for these replicas through index nodes efficiently by using distributed hash tables.

In this system and method, cluster ID for second level hashing are used (without needs for cluster heads), and index nodes are used to save locations of all replicas of a resource for efficient search. The number of index nodes is determined jointly with the number of replicas based on resource availability requirement. Moreover, after selecting the first index node through distributed hash tables, the remaining index nodes are selected within the same cluster as the first index one to reduce the search communication overhead.

It is noted that the above approach is not limited to an overlay where cluster heads are not necessary. The approach is applicable to any cluster-based network with or without cluster heads as long as one distributed hash tables can be constructed on the cluster level and one distributed hash tables can be constructed within each cluster.

When a resource needs to be stored in a networked resource sharing system, the resource replication scheme determines (1) the number of copies of the resource to be stored in the system and (2) on which nodes to store the copies of the resource. In the existing approaches, however, the problems of choosing the copy numbers and selecting the nodes to store the copies are considered separately. In addition, when selecting the 'best' nodes to store the resources, existing techniques do not consider that the nodes may be down in the future (due to power outage, network disconnection, etc.), while a practical model should take this into account.

Therefore, it is desirable to provide a networked resource sharing system that considers node capacity constraint and node up/down statistics, resource storage and transfer costs among the nodes, user request rates for the resources, and user (or system) specified resource availability requirements. Moreover, it is desirable to provide a systematic method for designing resource replication schemes wherein the scheme first chooses the copy numbers of the resources to be stored in the system to achieve different goals (e.g., satisfy resource availability requirements, or maximize the system hit probability), and then the scheme selects the nodes to store the copies of the resources by minimizing the total storage and expected transfer cost which takes account of node up/down statistics.

There are numerous instances of a networked resource sharing system. The resources can be electronic files, physical materials, or even specific services (e.g., copying or printing service). In the discussion below, electronic files are used as the example of resources, and the system is essentially a networked file storage system.

A networked file storage system can provide backup service for important files. By storing multiply copies of a file in several nodes possibly at different locations, it can improve the availability of the file in case of fault, failure, or disaster. It can also provide load balancing and reduce access latency if the file is accessed by a large population of geographically distributed users.

As another example, a networked file storage system can provide content delivery service to content providers as well as content consumers by storing popular files (e.g., Web pages, multimedia objects) in the system. By serving the user requests using the nodes that are close to the users, it can reduce the load of the origin content servers, save network bandwidth, and also provide better quality of service to the users.

The file replication scheme is a component for a networked file storage system. It determines the number of copies of each file to be stored as well as the nodes to store these copies in order to achieve different system objectives. As noted above, in the existing approaches, the problems of choosing the copy numbers and selecting the nodes to store the copies are considered separately. In addition, when selecting the 'best' nodes to store the files, existing techniques do not consider that the nodes may be down in the future (due to power outage, network disconnection, etc.), while a practical model should take this into account.

For the purposes of the discussion below, the system consists of N nodes (e.g., computers or multi-functional devices). Node i has a storage capacity $S_i$ (if there is no node capacity constraint, $S_i$ is set to be $\infty$). Moreover, the nodes can be organized in many different ways. For example, the nodes can be organized by a central server, or can be organized as a complete graph (i.e., each node is logically connected to every other node). More efficiently, the nodes can be organized using a distributed hashing table.

A node is up in the system with probability p, and is down with probability q=1−p. There are M files to be stored in the system. The size of file k is $b_k$. A user accesses the system via its local node (e.g., the node that is closest to the user).

Furthermore, for the purposes of the discussion below, let r(j, k) denote the user request rate (requests per unit time) initiated from node j for file k wherein r(j, k) is assumed known and remains stationary. Also, let $X_k=(x(i, k): 1 \leq i \leq N)$ denote the replication scheme for file k, where x(i, k) takes value 1 if the system stores a copy of file k at node i, and takes value 0 otherwise. Let $A_k=\{i: x(i, k)=1\}$ denote the set of nodes with a copy of file k under scheme $X_k$. Let X=(x(i, k): $1 \leq i \leq N, 1 \leq k \leq M$) denote the replication scheme for all files at all nodes.

In this system, the file replication scheme is made known to all nodes using a certain index service. For example, the file replication information can be stored in a central directory server, or in every node. More efficiently, the file replication information can be stored and distributed using a distributed hashing table. Also, it is assumed the index service is reliable, i.e., the index service always successfully returns $X_k$ (i.e., $A_k$) to any node querying for file k.

The storage cost of storing a copy of file k at node I is c(i, k). The cost may include a one-time storage cost, and may also include future update cost for updating this copy of file k at node i. Also, the transfer cost of sending a copy of file k form node i to node j is d(i, j, k). For example, the transfer cost can be the transmission delay of transferring file k from node i to node j.

$D_k$ is the miss cost of file k if a request for file k cannot be satisfied by an up node in the system. For example, $D_k$ can be the transfer cost of getting the file from the origin server outside the system. In addition, let C(j, k; $A_k$) denote the expected cost of serving a user request initiated from node j for file k. It depends on the locations of the copies of file k (i.e., $A_k$), and also depends on the specific user request serving strategy.

Given the parameters above, it is noted that $|A_k|=n_k$; i.e., $n_k$ copies of file k are stored in the system. Based upon this parameter, three strategies to serve a user request initiated from node j for file k and calculate the corresponding expected cost are described below.

The first strategy randomly select one of the up nodes in $A_k$ (i.e., nodes with a copy of file k) to serve the request. With probability $1-q^{n_k}$, at least one node in $A_k$ is up, and the request will be served by an up node with a copy of file k. By random selection, each node in $A_k$ has the same chance to serve the request. With probability $q^{n_k}$, all $n_k$ nodes in $A_k$ are down, and a miss cost of $D_k$ will be induced. Hence the expected cost is $$C(j, k; A_k) = \frac{1-q^{n_k}}{n_k} \sum_{i \in A_k} d(i, j, k) + q^{n_k} D_k.$$

The second strategy first selects the node i* with the minimum transfer cost d(i, j, k) among all nodes in $A_k$ to serve the request. If node i* is down, the second strategy randomly selects one of the up nodes in $A_k$ to serve the request. With probability p, node i* is up and will serve the request with the minimum transfer cost. With probability $1-p-q^{n_k}=q-q^{n_k}$, the request will be served by an up node in $A_k$ different from i*, and each with the same chance by random selection. Finally with probability $q^{n_k}$, all $n_k$ nodes in $A_k$ are down and a miss cost of $D_k$ will be induced. Hence the expected cost is $$C(j, k; A_k) = p \min_{i \in A_k} d(i, j, k) + \frac{q - q^{n_k}}{n_k - 1} \sum_{i \in A_k, i \neq i^*} d(i, j, k) + q^{n_k} D_k.$$

The third strategy selects the node with the minimum transfer cost d(i, j, k) among all up nodes in $A_k$ to serve the request. The third strategy ranks the nodes in $A_k$ such that $d(i_1, j, k) \leq d(i_2, j, k) \leq \ldots \leq d(i_{n_k}, j, k)$. With probability p, node $i_1$ is up and will serve the request with the minimum transfer cost. With probability q*p, node $i_1$ is down but node $i_2$ is up and will serve the request with the second minimum transfer cost. Finally with probability $q^{n_k}$, all $n_k$ nodes in $A_k$ are down and a miss cost of $D_k$ will be induced. Hence the expected cost is $C(j, k; A_k) =$ $$p \min_{i \in A_k} d(i, j, k) + q \cdot p \min_{i \in A_k} d(i, j, k) + \ldots + q^{n_k - 1} p \min_{i \in A_k} d(i, j, k) + q^{n_k} D_k$$

where $\min_i$ denotes the $i^{th}$ minimum term among the terms under consideration.

It is noted that under the same replication scheme $X_k$, the third strategy yields the lowest expected cost, and the first strategy yields the highest expected cost among the three strategies. On the other hand, the implementation complexity of the third strategy is the highest and the implementation complexity of the first strategy is the lowest. The second strategy makes a tradeoff between the first strategy and the third strategy.

The following will be a discussion of a method for designing file replication schemes. First, the number of copies of the files to be stored in the system is determined. This determination can be realized by two approaches.

The first approach for determining the number of copies of the files to be stored in the system is based upon file availability. The availability of a file is defined as the probability that a request for the file can be satisfied by an up node in the system. The file availability approach chooses $n_k$ copies of file k to be stored in the system such that the availability of file k is greater than or equal to a certain threshold $AVA_k$ wherein $$1 - q^{n_k} \geq AVA_k \Rightarrow n_k \geq \left\lceil \frac{\ln(1 - AVA_k)}{\ln q} \right\rceil.$$

The file availability approach only requires the information of node up/down statistics, and user specified (or system specified) file availability requirements. It can be calculated for different files independently, which is desirable if the system has no complete information of all files, and the files are stored into the system dynamically.

The second approach for determining the number of copies of the files to be stored in the system is based upon a system hit rate approach. The hit rate of a system is defined as the probability that a request for any file can be satisfied by an up node in the system. The system hit rate approach chooses $n_k$ copies of file k to be stored in the system such that the hit rate of the system is maximized. Thus, let $r_k = \Sigma_j r(j, k)/\Sigma_k \Sigma_j r(j, k)$ denote the probability that an incoming request is for file k so that the following optimization problem is realized:

$$\max \sum_{k=1}^{M} r_k(1 - q^{n_k}) \equiv 1 - \sum_{k=1}^{M} r_k q^{n_k}$$

$$\text{s.t.} \sum_{k=1}^{M} b_k n_k \leq S$$

where $S=\Sigma_i S_i$ is the total node storage capacity.

It is noted that the optimization problem does not consider individual node capacity constraint, so the solution of the optimization problem provides an upper bound of the system hit rate. This optimization problem can be solved exactly using dynamic programming, or can be solved approximately by first relaxing the integer requirement of $n_k$ and then rounding it to an integer.

The system hit rate approach requires more information than the file availability approach does, including node up/down statistics, the request probabilities for all files, the sizes of all files, and the total node storage capacity. Hence the system hit rate approach can be utilized when the system has complete information of all files, and the files to be stored remain static.

After the number of copies of the files to be stored in the system is determined, the nodes to store the copies of the files are selected. Given that the system decides to store $n_k$ copies of file k, for all files, the cost minimization problem then is to select $n_k$ nodes, each of which stores a copy of file k, for all files, such that the total (storage, transfer) cost is minimized, under the node storage capacity constraints. The optimization problem can be described as the following integer programming problem:

$$\min \sum_{k=1}^{M} \sum_{i=1}^{N} c(i, k) x(i, k) + \sum_{k=1}^{N} \sum_{j=1}^{N} r(j, k) C(j, k; A_k)$$

$$\text{s.t.} \sum_{i=1}^{N} x(i, k) = n_k \quad k = 1, \ldots, M;$$

$$\sum_{k=1}^{M} b_k x(i, k) \leq S_i \quad i = 1, \ldots, N;$$

$$x(i, k) \in \{0, 1\}.$$

In the objective function, the first term includes the storage costs: if the system stores a copy of file k at node i, i.e., if x(i, k)=1, a cost of c(i, k) is induced. The second term includes the expected transfer costs: if there is a request from node j for file k, an expected cost of C(j, k; $A_k$) is induced, based on the employed request serving strategy discussed above.

It is noted that in the objective function, the expected cost C(j, k; $A_k$) is used, which takes account of node up/down statistics. The above optimization problem is a complex combinatorial optimization problem. Even for M=1 (one file), the problem is a variant of the well known Minimum K-Median problem, which is known to be NP-hard. Instead of solving the above optimization problem exactly, two approaches will be described below as an alternative to solving the above optimization problem exactly. The first approach is a random scheme, and the second approach is a greedy scheme. These approaches are used to find the locations of the copies of the files.

In each of these approaches, let r(k)=$\Sigma_j$r(j, k) denote the total user request rate for file k from all nodes. The files are ranked according to their total request rates such that r(1)≥r(2)≥ . . . ≥r(M), and the files are stored with respect to their request rates in a descending order. However, it is noted that the files may enter the system dynamically, and a file with lower request rate may enter the system first. In this case, the least frequently used file replacement scheme can be implemented at every node (when a node wants to store a new file but its storage space is full, the node will delete the file which is requested least frequently in the past to save space to store the new file) to mimic the ranking and storing procedure.

In the random scheme approach, for file k, 1≤k≤M, the approach randomly selects $n_k$ nodes to store file k. The algorithm terminates when all copies of the files are stored in the system, or when all nodes are full of capacity. The random scheme assumes minimum information of the files and the costs, which is desirable if complete information is not available. The computational complexity of the random scheme is O(M·$\bar{n}$) where n is the average value of $n_k$.

In the greedy scheme approach, for file k, 1≤k≤M, and for n=1, 2, . . . , $n_k$, given nodes $i_1, i_2, \ldots, i_{n-1}$ have a copy of file k, find the best node $i_n$ among the other nodes to store a copy of file k such that the cost c($i_n$, k)+$\Sigma_j$r(j, k)C(j, k; $\{i_1, i_2, \ldots i_n\}$) is minimized. The algorithm terminates when all copies of the files are stored in the system, or when all nodes are full of capacity. The greedy scheme requires information of user request rates for files, the storage cost of every node, and the expected transfer cost from a node to another (i.e., information of the transfer costs and node up/down statistics), which is desirable if such complete information is available. The computational complexity of the greedy scheme is O(M·$\bar{n}\cdot N^2\cdot T$). T is the computational complexity of evaluating the expected transfer cost C(j, k; $A_k$), which depends on the specific user request serving strategy as described above. For the first and second strategies described above, T=O($\bar{n}$). For the third strategy described above, T=O($\bar{n}^2$).

The following discussion will evaluate the performance of six different file replication schemes. The first two schemes are based only on local information. The other four schemes are designed based on our proposed design method.

The first scheme is the local popularity scheme wherein each node ranks the files according to their local request rates; files that are requested more frequently are more popular; the node stores the files according to their popularity in a descending order up to its storage capacity. Again, every node can implement the least frequently used file replacement scheme to mimic the ranking and storing procedure if files enter into the node dynamically (this is known as Caching).

The second scheme is the local hybrid scheme wherein each node allocates a certain portion of its storage to store the most popular files based on the local request rates, and allocates the remaining portion to store files randomly. The third scheme is a combination of the file availability and random scheme approaches wherein the system determines the copy number of each file using the file availability approach and selects the nodes to store the copies using the random scheme.

The fourth scheme is a combination of the system hit rate and random scheme approaches wherein the system determines the copy number of each file using the system hit rate approach and selects the nodes to store the copies using the random scheme. The fifth scheme is a combination of the file availability and greedy scheme approaches wherein the system determines the copy number of each file using the file availability approach and selects the nodes to store the copies using the greedy scheme. The last scheme is a combination of the system hit rate and greedy scheme approaches wherein the system determines the copy number of each file using the system hit rate approach and selects the nodes to store the copies using the greedy scheme.

In these evaluations, the system consists of N=50 nodes, and there are M=5,000 files. The size of each file is chosen at random uniformly among integers in [1, 10]. Let B=$\Sigma_k b_k$ be the total file size. Let S=F*B be the total node storage capacity, where F is the ratio between the total node storage capacity and total file size. The storage capacity, $S_i$, of node i is set to be S/N. The (normalized) user request rate (for all files) at node j, r(j), is selected at random uniformly in [0,1]. It is assumed that file popularity follows a Zipfian distribution, i.e., r(j, k)∝r(j)/$k^\alpha$, which is widely observed in web server and caching systems. In the evaluations, $\alpha$ is set to be 0.75. The storage cost c(i, k) is set to be 0. The transfer cost d(i, j, k) equals d(i, j)·$b_k$, which is proportional to the network distance between node i and node j, d(i, j), and the file size $b_k$. d(i, j) is chosen at random uniformly among integers in [1, 10]. The miss cost $D_k$ is set to be 10$b_k$. When the file availability approach is used to determine the copy numbers of the files, the availability threshold is set to be 0.99.

The results for p=0.5 (i.e., each node is up in the system in half of the time) and user request serving the third strategy, as described above, are shown in FIGS. 5 and 6. In both FIGS. 5 and 6, the x-axis denotes the ratio between the total node storage capacity and the total file size. A ratio of three means that the system can store (at most) three copies of each file, and a ratio less than one means that the system cannot store all files in the system.

Figure 5:
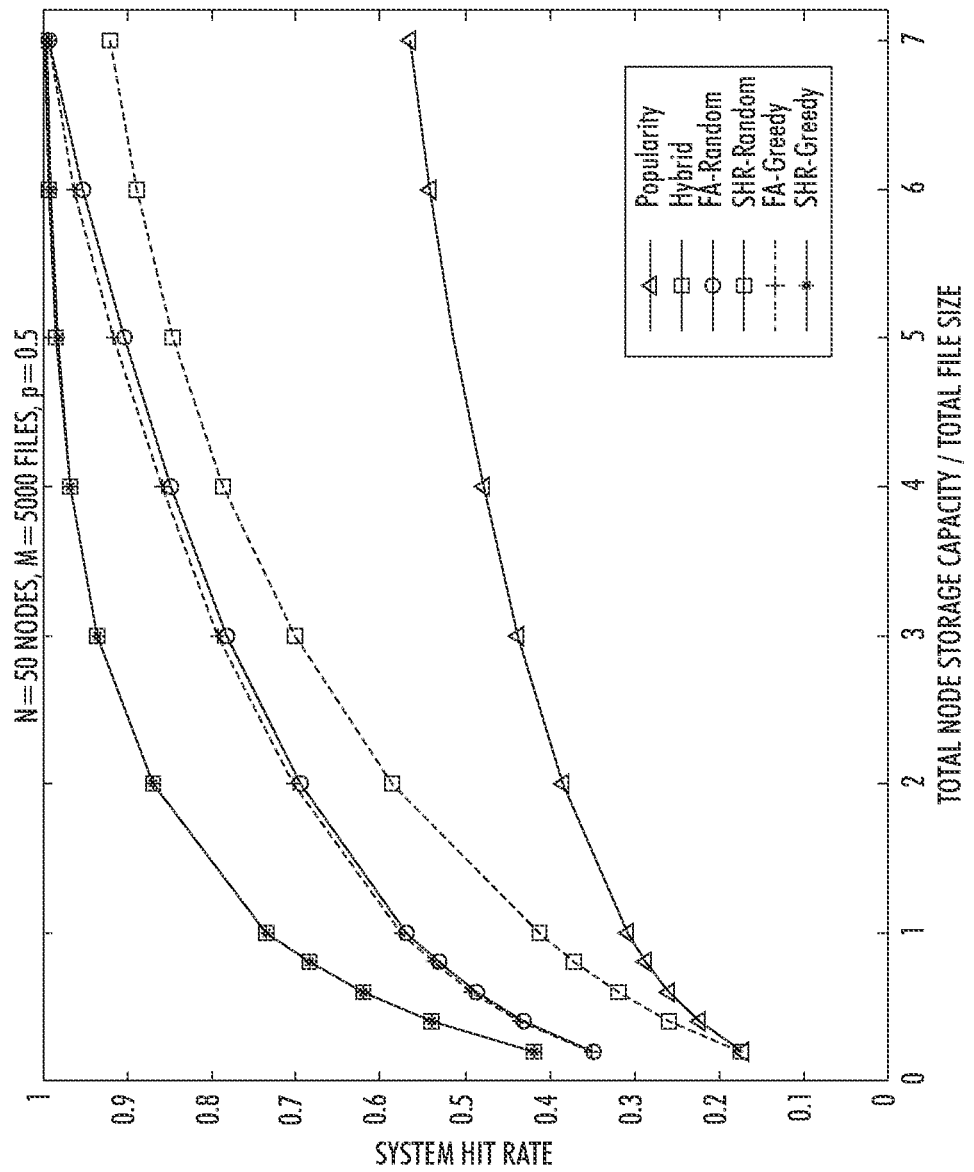
FIG. 5 graphically illustrates a system hit rate of different file replication schemes.

In FIG. 5, the system hit rate of the different replication schemes is shown. The local popularity scheme has the lowest system hit rate because all the nodes store the same popular files so that they cannot get files from each other. For the local hybrid scheme, each node allocates half of its storage space to store local popular files, and the other half of its storage space to store files randomly. This simple modification greatly increases the system hit rate. The four other schemes achieve higher system hit rate than the two local based schemes. If the system hit rate approach is used to determine the copy numbers of the files, the system hit rate is the highest, and it does not matter which scheme (random or greedy) is applied to choose the locations of the copies, because the copy numbers of all files solely determine the system hit rate.

Figure 6:
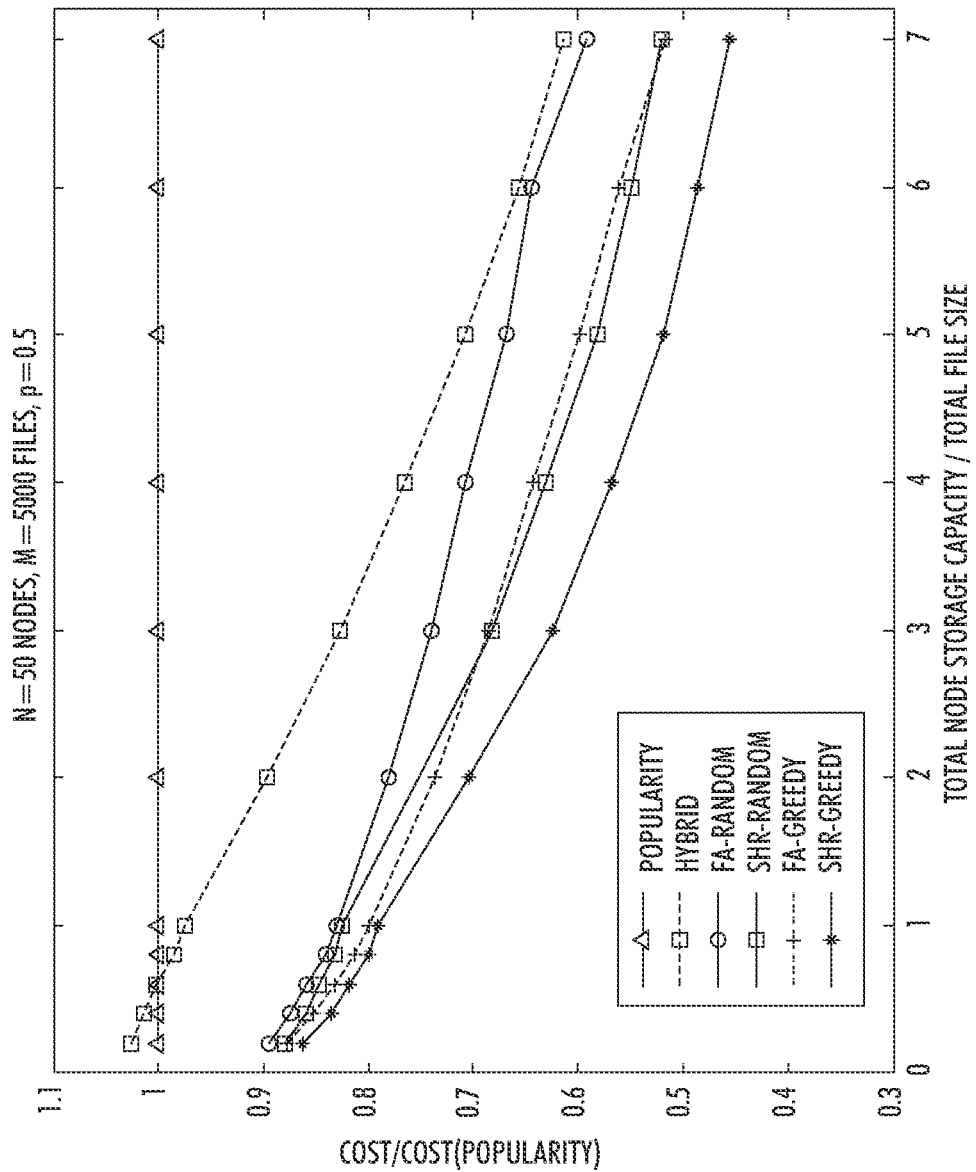
FIG. 6 graphically illustrates a cost of different file replication schemes.

In FIG. 6, the cost of the different replication schemes is shown. The cost of the local popularity scheme is normalized to be 1, and the costs of other schemes are also normalized according to the local popularity scheme so that percentage improvements are clearly shown. Again, the local popularity scheme results in the highest cost since its system hit rate is very low and this introduces a large miss cost. The local hybrid scheme reduces the cost significantly. Among the four other schemes, for copy number selection, the system hit rate approach is better than the file availability approach in terms of cost saving; for location selection, the greedy scheme is better than the random scheme in terms of cost saving. However, the better cost saving is due to more information required and more implementation/computational complexity induced by the system hit rate approach and the greedy scheme.

It is desirable to design and implement a file replication scheme for the system based on the available information, the desired level of implementation/computational complexity, and the desired level of system performance (system hit rate and total cost).

The following discussion is an extension to heterogeneous node up/down probabilities. To extend the method to handle heterogeneous node up/down probabilities, it is assumed that node i is up with probability $p_i$, and is down with probability $q_i=1-p_i$.

For the combination of the file availability and random scheme approaches, the combination works as follows. For file k, $1 \leq k \leq M$, (1) randomly select one node $i_1$ to store the first copy of file k, the availability of file k now being $P_{i1}$, and (2) randomly select another node $i_2$ (different from $i_1$) to store the second copy of file k, the availability of file k now being $1-q_{i1}q_{i2}$. The process is repeated until the availability requirement of file k is satisfied, or until all nodes are full.

For the combination of the file availability and greedy scheme approaches, the combination works as follows. For file k, $1 \leq k \leq M$, (1) first select the best node $i_1$ that minimizes the expected cost $c(i_1, k)+\Sigma_j r(j, k)C(j, k; \{i_1\})$ to store the first copy of file k, the availability of file k now being $P_{i1}$, and (2) given node $i_1$ has a copy of file k, find the best node $i_2$ among the other nodes to store the second copy of file k such that $c(i_2, k)+\Sigma_j r(j, k)C(j, k; \{i_1, i_2\})$ is minimized, the availability of file k now being $1-q_{i1}q_{i2}$. The process is repeated until the availability requirement of file k is satisfied, or until all nodes are full.

In summary, the above approaches consider node capacity constraint and node up/down statistics, resource storage and transfer costs among the nodes, user request rates for resources, and user (or system) specified resource availability requirements; make use of information about node capacity constraint and node up/down statistics, user (or system) specified resource availability requirements or user request rates for resources to determine the number of copies of the resources to be stored in the system; and make use of information about node capacity constraint and node up/down statistics, user request rates for resources, and resource storage and transfer costs among the nodes to select the nodes to store the copies of the resources.

A peer-to-peer file storage network consists of peer nodes (computers, devices, etc.) that wish to share their storage and store files cooperatively to increase their own utilities or provide certain services (e.g., document backup, content delivery, etc.) to the users. Above, a method for designing file replication schemes in a general networked file storage system has been discussed. However, several implementation issues remain unspecified, e.g., how to logically connect the nodes and how to distribute the file replication information to the querying nodes in an efficient way, and most importantly, how to implement the file replication scheme in a distributed and adaptive manner that can scale to a large number of nodes and files and can handle cases when user request pattern changes over time.

Below, a method to implement the file replication schemes for a peer-to-peer file storage network will be discussed. The nodes are organized using a distributed hashing table and form a peer-to-peer overlay network. The index service provided by the distributed hash tables will be used to distribute the file replication information to the nodes that have user requests for a file. The index node (or a set of index nodes) for a given file will also take responsibility for collecting the required information (such as user request rates, storage cost and communication costs among the nodes) to make the copy number and location decisions for that file to satisfy the file availability requirement and minimize the total storage and expected transfer cost.

In this example, the nodes form a peer-to-peer overlay network. Many conventional peer-to-peer networks such as CAN, CHORD, are based on distributed hash tables. Distributed hash tables provide a decentralized, many-to-one mapping between user objects (e.g., files) and nodes in the network. This mapping is accomplished by organizing the nodes in some virtual coordinate space and hashing each object to these virtual coordinates. The information about an object (such as the location of the object) is kept by a node that is in charge of the object (the index node for that object) determined by the mapping. Their distributed structure, excellent scalability, short search hops, and failure resilience make distributed hash tables highly suitable for peer-to-peer networks.

Moreover, in this explanation, the system consists of N nodes wherein node i has a storage capacity $S_i$. The nodes are organized using a distributed hash tables and form a structured overlay network. In CHORD, every node is assigned an ID (e.g., based on the IP address of the node), and the nodes form a logical ring based on their IDs. Each node maintains a neighbor list (called the finger table) that includes O(log N) number of neighbors on the logical ring. A node is up in the system with probability $p_i$, and is down with probability $q_i=1-p_i$. A user accesses the system via its local node (e.g., the node that is closest to the user), and r(j, k) is the user request rate initiated from node j for file k. For this example, let $X_k=(x(i, k): 1 \leq i \leq N)$ denote the replication scheme for file k, where x(i, k) takes value 1 if node i has a copy of file k, and takes value 0 otherwise, and let $A_k=\{i: x(i, k)=1\}$ denote the set of nodes with a copy of file k under scheme $X_k$.

The index service provided by the distributed hash tables is used to store and distribute the file replication information to the nodes. Each file k is also assigned an ID (e.g., based on the file name), and the file is mapped to one node (or a group of nodes) based on the ID of the file and the nodes. These node(s) are called the index node (set) for file k, denoted by I(k) wherein I(k) will store the replication information $A_k$ for file k. When a node requests for file k, it will first locate the index node I(k) for file k using the distributed hash tables. The querying node then will contact I(k) for $A_k$. It is noted that $\alpha_k$ is the probability that the index service successfully returns $A_k$ to the querying node. For example, if I(k) a single node, since it will be down with probability $p_{I(k)}$, $\alpha_k=p_{I(k)}$. If I(k) is a set of nodes, $\alpha_k$ equals one minus the probability that all nodes in $I_k$ are down.

The storage cost of storing a copy of file k at node i is c(i, k), and d(i, j, k) is the transfer cost of sending a copy of file k form node i to node j wherein d(i, j, k) is proportional to the network distance d(i, j) (e.g., number of hops, transmission delay) between the two nodes and the size of file k). It is further noted that $D_k$ is the miss cost of file k if a request for file k cannot be satisfied by an up node in the system, and C(j, k; $A_k$) is the expected cost of serving a user request initiated from node j for file k.

A method to implement a distributed and adaptive file replication scheme will be discussed below. In this method, for file k, the index node I(k) is used to collect the information and to make the replication decision for file k (for simplicity, it is assumed that there is a single index node I(k) for file k, but the method can be extended to a set of index nodes for file k as well).

When a file k first enters into the system, it is assumed that the system has no prior information of the user request rates for that file. The index node for file k, I(k), will apply the file availability-random scheme approach to make the file copy number and location decisions. In this approach, I(k) randomly selects one node $i_1$ in its neighbor list to store the first copy of file k, the availability of file k now being $\alpha_k p_{i1}$ since the file is available to a querying node if and only if both the index service successfully returns node $i_1$ to the querying node and node $i_1$ is up. Thereafter, I(k) randomly selects another node (different from $i_1$) in its neighbor list to store the second copy of file k, the availability of file k now being $\alpha_k(1-q_{i1}q_{i2})$, since the file is not available to a querying node if and only if both node $i_1$ and node $i_2$ are down. The process is repeated until the availability requirement of file k is satisfied.

If I(k) does not have enough number of neighbors to store all the copies of file k, I(k) can consider its two (or more)-hop neighbors (i.e., the neighbors of the neighbor of I(k)). I(k) will maintain the list of nodes that stores a copy of file k (i.e., $A_k$).

When a user from node j requests file k, node j can locate the index node I(k) for file k using the distributed hash tables. If I(k) is up, it will return the replication information $A_k$ for file k to node j. Node j then uses a user request serving strategy to select one node in $A_k$ to serve the user request, as described above.

Since all user requests for file k are directed to I(k), I(k) can collect the user request statistics from all nodes that have requested file k. I(k) maintains a list of nodes $U_k$ that have requested file k, and measures the request rate r(j, k) for each node j in $U_k$. I(k) also collects the node up/down statistics, the storage cost and transfer cost information from the nodes in $U_k$. Note that the system could have a large number of (e.g., thousands of) nodes, but $U_k$ (the set of nodes that have user requests for file k) may be only a small subset of the total nodes.

After I(k) has collected sufficient statistics, it will apply the file availability-greedy scheme, as described above, to make the file copy number and location decisions. In this approach, I(k) first selects the best node $i_1$ in $U_k$ that minimizes the expected cost $c(i_1,k)+\Sigma_j r(j,k)C(j,k;\{i_1\})$ to store the first copy of file k, the availability of file k now being $\alpha_k p_{i1}$. Thereafter, given node $i_1$ has a copy of file k, I(k) selects the best node $i_2$ among the other nodes in $U_k$ to store the second copy of file k such that $C(i_2, k)+\Sigma_j r(j, k)C(j, k; \{i_1, i_2\})$ is minimized, the availability of file k now being $\alpha_k(1-q_{i1}q_{i2})$. The process is repeated until the availability requirement of file k is satisfied. The copies of file k originally stored at nodes selected by the file availability-random scheme will now be migrated to the newly selected nodes, and I(k) again will maintain the new list of nodes with of a copy of file k.

Since all user request are directed to I(k), I(k) can naturally keep collecting and updating the user request statistics. If user request pattern changes (or network condition changes which will affect the transfer costs among the nodes), I(k) will initiate file migration again when necessarily (e.g., if cost saving after file migration exceeds a certain threshold).

In summary, a system and method implements the file replication scheme in a distributed and adaptive manner for a peer-to-peer file storage network. This approach can handle a large number of nodes, the nodes being organized using a distributed hash tables, which provides distributed and scalable node management and search services. In addition, a hierarchical distributed hash tables (e.g., a two-level Chord) can be implemented if the system consists of a large number of geographically distributed nodes.

The approach also can handle a large number of files, using the index node (or a set of index nodes) for each file to collect the required information (such as user request rates, storage and transfer costs among the nodes that have user requests for the file) and making file replication/migration decisions. Since files are assigned to different index nodes uniformly via the distributed hash tables, the information collecting and file replication/migration decision making load is evenly distributed among the index nodes (and essentially among all nodes in the system if every node can provide index service). In addition, files with similar properties (e.g., user request statistics) can be aggregated into a super file to reduce the actual number of files the system needs to consider. Lastly, the approach can handle user request pattern changes (or network condition changes which affect the transfer costs among the nodes) through file migration.

It is noted that a network overlay, according to the various concepts described above, may include a logical network structure of nodes, an ordering of the nodes being defined. The logical network structure may include a first cluster of nodes. Each node within the first cluster contains a link to a previous node in the first cluster and a link to a successor node in the first cluster. A node within the first cluster contains a virtual link to a node in a second cluster of nodes.

The virtual link may include a link to a predecessor node selected from the nodes of the second cluster or may include a link to a successor node selected from the nodes of said second cluster. The logical network structure of nodes may include a plurality of clusters, the plurality of clusters being ordered. Moreover, each node may contain an identifier for itself and an identified for its cluster.

Each node and cluster ordering may be based upon their respective identifiers. A node may contain a virtual link to a previous cluster and a virtual link to a successor cluster. A node may contain a virtual link for a cluster at a different level. A node may contain a virtual link for a previous cluster at a first level and a virtual link for a previous cluster at a second level.

The logical network structure of nodes may include multiple levels of clusters. The multiple levels of clusters may be ordered. The first level and the second level may be different. The logical network structure of nodes may include a single level of clusters. The clustering of nodes may be based upon a locality metric.

It is noted that a resource storage and retrieval method stores more than one instance of a resource within a peer-to-peer network; stores locations of the stored instances of the resource in a first index node; stores locations of the stored instances of the resource in a second index node; and stores one instance of the resource at an optimal location within the peer-to-peer network.

A number of stored resource instances may be dependent upon an up probability of nodes within the peer-to-peer network. A number of index nodes storing the locations of the stored instances of the resource may be dependent upon an up probability of nodes within the peer-to-peer network.

The peer-to-peer network may include a cluster of nodes. The first index node may be located in a same cluster of nodes as one instance of the stored resource. The first index node may be located in accordance with a hash table and/or in accordance with hashing a name of the resource. The first index node and the second index node may be successively ordered nodes within a cluster.

A method, according to the various concepts described above, for determining the storage locations in a network for copies of a resource may determine a number of copies of the resource to be stored and select which nodes of the network should store a copy of the resource wherein the determining and selecting is based upon a probability that a node will be down. The determining and selecting may also be based upon a capacity of nodes to store the resources, a storage cost, a transfer cost, and/or an expected request rate for a resource.

The determining of the number of copies may be based upon calculating the sufficient number of copies to meet a predefined probability that a request for a resource can be satisfied and/or maximizing a hit rate of the system The selecting of nodes may be based upon a minimization of the storage and transfer costs. The selecting of nodes may be applied to resources in order of the request rates for those resources.

The selecting of nodes may be random. The selecting of nodes for storage locations may be dynamic and adaptive. The expected request rate for a resource may be dynamically calculated by channeling a request through an index node and collecting request statistics.

The number of copies may be determined such as to meet a predefined probability that a request can be satisfied when a resource first enters the system. The nodes at which the resource is stored my be selected randomly when a resource first enters the system. The nodes on which the resource is stored my be recalculated so as to minimize costs when a resource request rate has be established.

A method, according to the various concepts described above, for determining the storage locations in a network for copies of a resource may determine a number of copies of the resource to be stored and select which nodes of the network should store a copy of the resource wherein the determining and selecting is based upon a probability that a node will be down and a cost of not satisfying a resource request. The determining and selecting may also be based upon a capacity of nodes to store the resources, a storage cost, a transfer cost, and/or an expected request rate for a resource.

The determining of the number of copies may be based upon calculating the sufficient number of copies to meet a predefined probability that a request for a resource can be satisfied and/or maximizing a hit rate of the system The selecting of nodes may be based upon a minimization of the storage and transfer costs. The selecting of nodes may be applied to resources in order of the request rates for those resources.

The selecting of nodes may be random. The selecting of nodes for storage locations may be dynamic and adaptive. The expected request rate for a resource may be dynamically calculated by channeling a request through an index node and collecting request statistics.

The number of copies may be determined such as to meet a predefined probability that a request can be satisfied when a resource first enters the system. The nodes at which the resource is stored my be selected randomly when a resource first enters the system. The nodes on which the resource is stored my be recalculated so as to minimize costs when a resource request rate has be established.

It will be appreciated that various of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the following claims.

What is claimed is:

1. A method for determining storage locations for a resource and copies thereof, a storage location being associated with a node in a network of nodes, the network of nodes forming a system, comprising:
    (a) determining, when a resource first enters the system for storage thereof, a number of copies of the resource to be stored, based upon a probability that a node will be down, the copies of the resource to be stored being determined copies;
    (b) randomly selecting, when the resource first enters the system for storage thereof, a number of nodes to store the determined copies thereon, the number of nodes being equal to the number of determined copies;
    (c) storing the determined copies on the randomly selected nodes, the determined copies stored on the randomly selected nodes being stored determined copies;
    (d) reselecting, when a predetermined number of requests have been received for the stored resource, nodes to store the stored determined copies thereon, based upon a minimization of a storage cost; and
    (e) storing the stored determined copies on the reselected nodes, the stored determined copies being the determined copies previously stored on the randomly selected nodes.

2. The method as claimed in claim 1, wherein the storage cost includes a capacity of nodes to store the resources.

3. The method as claimed in claim 1, wherein said reselecting the nodes to store the stored determined copies thereon is based upon a minimization of a storage cost and a minimization of a transfer cost.

4. The method as claimed in claim 2, wherein said reselecting the nodes to store the stored determined copies thereon is based upon a minimization of a storage cost and a minimization of a transfer cost.

5. The method as claimed in claim 1, wherein said determining the number of copies is based upon calculating the sufficient number of copies to meet a predefined probability that a request for a resource can be satisfied.

6. The method as claimed in claim 1, wherein said determining the number of copies is based upon maximizing a hit rate of the system.

* * * * *